US005122268A

United States Patent [19]

Burack et al.

[11] Patent Number: 5,122,268

[45] Date of Patent: Jun. 16, 1992

[54] APPARATUS FOR WASTE DISPOSAL OF RADIOACTIVE HAZARDOUS WASTE

[75] Inventors: Robert D. Burack, Pleasant Hills; William J. Stenger, Penn Township, Westmoreland County, both of Pa.; Clinton R. Wolfe, Aiken, S.C.

[73] Assignee: Westinghouse Electric Corp., Pittsburgh, Pa.

[21] Appl. No.: 392,854

[22] Filed: Aug. 11, 1989

[51] Int. Cl.[5] .............. B01D 15/00

[52] U.S. Cl. .............. 210/202; 210/259; 210/266; 252/626; 252/631; 252/633; 423/6

[58] Field of Search .............. 252/626, 631, 633; 423/6; 210/663, 665, 668, 682, 751, 759, 763, 198.1, 259, 266, 202; 422/159, 903

[56] References Cited

U.S. PATENT DOCUMENTS

| | | | |
|---|---|---|---|
| 4,049,545 | 9/1977 | Horvath | 210/28 |
| 4,100,065 | 7/1978 | Etzel | 210/38 B |
| 4,119,560 | 10/1978 | Sheeline | 252/301.1 W |
| 4,163,716 | 8/1979 | Turnbull | 210/28 |
| 4,210,530 | 7/1980 | Etzel et al. | 210/38 B |
| 4,276,176 | 6/1981 | Shorr | 210/637 |
| 4,332,687 | 6/1982 | Daignault et al. | 210/721 |
| 4,374,028 | 2/1983 | Medina | 210/669 |
| 4,482,459 | 11/1984 | Shiver | 210/639 |
| 4,512,900 | 4/1985 | Macur et al. | 210/748 |
| 4,624,790 | 11/1986 | Kamperman et al. | 210/665 |
| 4,624,792 | 11/1986 | Yamanaka et al. | 210/759 |
| 4,648,977 | 3/1987 | Garg et al. | 210/673 |
| 4,693,833 | 9/1987 | Toshikuni et al. | 210/759 |
| 4,698,136 | 10/1987 | El-Allawy | 203/11 |
| 4,737,315 | 4/1988 | Suzuki et al. | 252/632 |
| 4,756,833 | 7/1988 | Schlossel | 210/662 |
| 4,758,351 | 7/1988 | Kern | 210/688 |
| 4,770,783 | 9/1988 | Gustavsson et al. | 210/638 |
| 4,877,558 | 10/1989 | Morioka et al. | 252/626 |

*Primary Examiner*—Brooks H. Hunt

*Assistant Examiner*—Ngoclan T. Nai

[57] ABSTRACT

In accordance with the present invention, there is described a method and apparatus for concentrating dissolved and solid radioactive materials carried in a waste water solution containing a hazardous chelating agent used for cleaning nuclear equipment. An oxidizing stage for receiving the waste water containing the radioactive materials and the hazardous chelating agent in the presence of an oxidizing agent oxidizes the chelating agent into non-hazardous constituents including gas and water. A separator coupled to the oxidizing chamber receives the waste water containing the radioactive material and separates the radioactive solids from the waste water containing dissolved radioactive materials. An ion exchange chamber containing an ion exchange resin receives the waste water containing the dissolved radioactive materials and removes the same from the waste water by ion exchange with the resin. A dryer receives the radioactive solids from the separator for removing water of hydration therefrom and producing dry solids. A packaging station receives the dry solids and the spent ion exchange resin containing the removed dissolved radioactive materials for packing them in solid form for disposal.

11 Claims, 2 Drawing Sheets

APPARATUS FOR WASTE DISPOSAL OF RADIOACTIVE HAZARDOUS WASTE

BACKGROUND OF THE INVENTION

1. Field of the Invention

The invention relates to a method and apparatus for waste water treatment. In particular, the invention relates to the treatment of radioactive hazardous toxic waste materials and the safe disposal thereof.

2. Description of the Art

Contaminated radioactive waste solutions containing high concentrations of chelating agents such as EDTA are sometimes generated during the application of chemical cleaning processes to nuclear equipment such as the secondary side of a nuclear steam generator. There are a variety of disposal techniques for handling these waste solutions.

One method of disposal includes the separation of the hazardous constituents from the non-hazardous constituents and evaporation of the waste water to retrieve solids, which can then be buried in a disposal site. However, current waste disposal regulations make this method unacceptable mainly because the solid hazardous waste contains EDTA, NTA, citric acid or other chelating agents. Chelating agents may leak from the disposal site, migrate through the soil and mix with the ground water supplies, while carrying chemically bonded radioactive or other hazardous species. For this reason, hazardous waste disposal sites set stringent limits on the amount of chelating agent allowed to be present in waste material accepted for burial. In other words, significant concentrations of chelating agent may not be disposed concurrently with radioactive waste.

Another method of disposal involves chelant destruction in which the chelating agent is oxidized or pyrolized into relatively harmless constituents and the radioactive species are disposed of at the burial site. The choice of which method to use is determined by the effectiveness, the cost, and the time required to effect the solution. Volume reduction of the untreated material, for example, by evaporation techniques is effective. However, the costs including capital and operating costs as well as waste site charges makes this volume reduction method unattractive. Further, the final concentration of the chelant may exceed the disposal site limits making the method effectively unavailable. The complexity of various related volume reduction techniques also bears negatively on this technique.

In separation technology the metal ions (predominantly iron and copper) and radionuclides which typically follow them, are separated from the chelant. The former require radioactive disposal and the latter is treated as a non-radioactive hazardous waste. Ion exchange, membrane and magnetic filtration technologies may possibly achieve the desired results for dilute concentrations. These technologies, however, have not been proven in terms of feasibility and cost effectiveness.

With chelant destruction technology, the chelant is transformed into a non-hazardous species. Subsequent processing is then used to reduce the volume of the radioactive waste. Pyrolitic decomposition may be effective but as yet is not licensed. Electrolytic chelant decomposition is relatively slow. Various oxidation techniques appear to be useful but each has its drawbacks. Ozone treatment of the chelant requires expensive equipment and is slow but does not significantly increase waste volume. Also it has not proved to be effective. Peroxide treatment is more cost effective but adds waste volume.

SUMMARY OF THE INVENTION

In accordance with the present invention, there is described a method and apparatus for concentrating dissolved and solid radioactive materials carried in a waste water solution containing a hazardous chelating agent used for cleaning nuclear equipment. An oxidizing stage for receiving the waste water containing the radioactive materials and the hazardous chelating agent in the presence of an oxidizing agent oxidizes the chelating agent into non-hazardous constituents including gas and water. A separator coupled to the oxidizing chamber receives the waste water containing the radioactive material and separates the radioactive solids from the waste water containing dissolved radioactive materials. An ion exchange chamber containing an ion exchange resin receives the waste water containing the dissolved radioactive materials and removes the same from the waste water by ion exchange with the resin. A dryer receives the radioactive solids from the separator for removing water of hydration therefrom and producing dry solids. A packaging station receives the dry solids and the spent ion exchange resin containing the removed dissolved radioactive materials for packing them in solid form for disposal.

DESCRIPTION OF THE PREFERRED EMBODIMENT

The present invention is adapted for disposal of contaminated radioactive waste and in particular to steam generator secondary side chemical cleaning waste materials. However, it should be understood that waste from whatever source having similar properties may be processed in accordance with the present invention.

In accordance with the waste disposal technique described herein, chemical cleaning wastes containing, for example, EDTA and iron oxide (rust) are oxidized using a hydrogen peroxide solution. The EDTA in solution will be destroyed by the peroxide and predominantly ferrous metals, i.e. iron, and other metals will precipitate out of the solution. The precipitates are concentrated and buried as solid waste at a disposal site. The water is treated, tested and disposed of as a non-radioactive material or it may be recycled in the plant.

Figure 1:
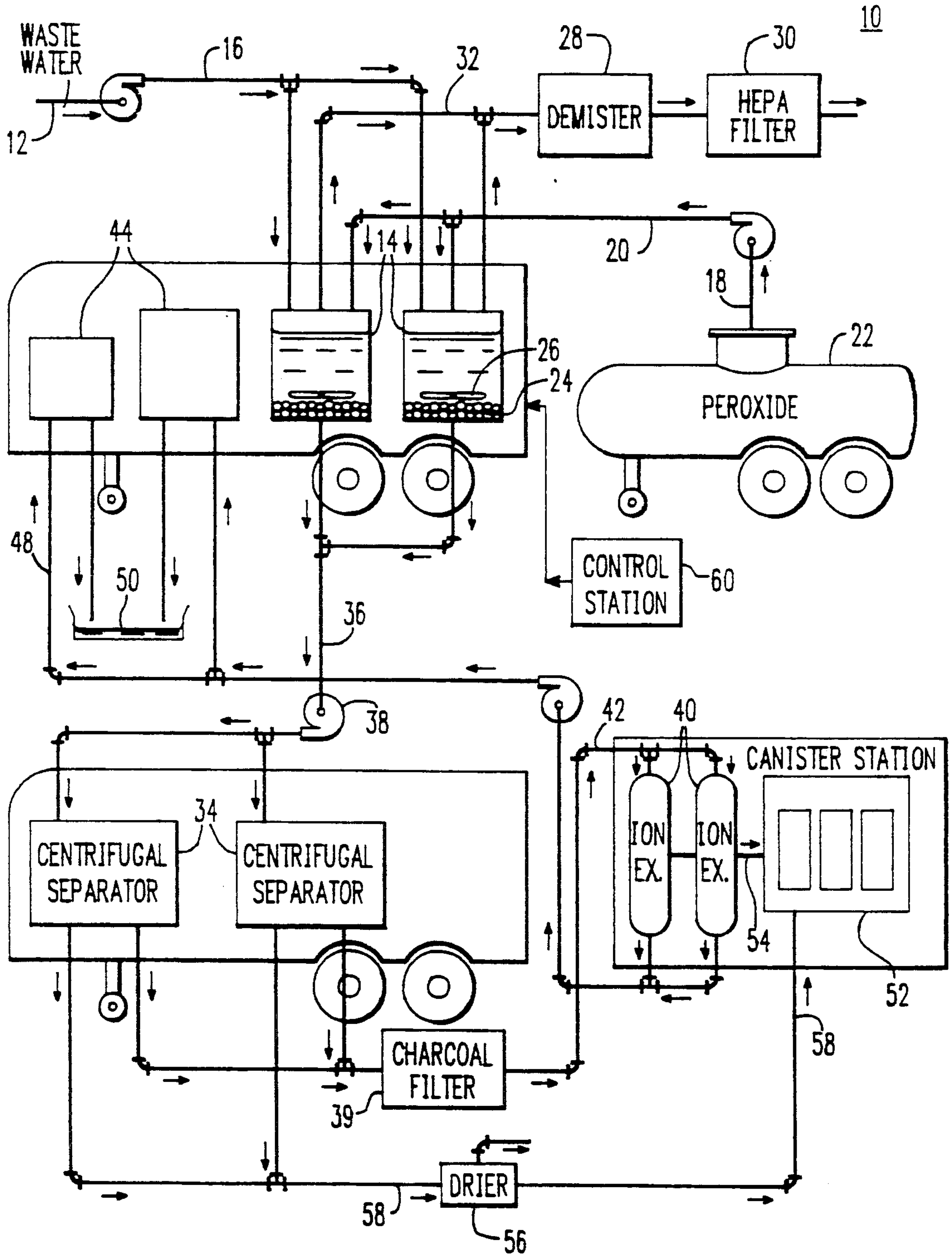
FIG. 1 is a schematic block diagram of the apparatus of the present invention.

In accordance with the present invention a system 10 for effecting waste disposal is illustrated in FIG. 1. The system 10 is supplied with a contaminated radioactive waste water feed stock 12 for treatment. The waste water 12 is first pumped into reaction tanks 14 via the inlet 16. A hydrogen peroxide solution 18 is supplied to the reaction tanks 14 via inlets 20 from a supply 22 (e.g. a tanker). The hydrogen peroxide 18 and the chelant (EDTA) in the waste water 12 reacts such that most of the chelant (e.g. 99%), which is an organic material, is oxidized to several harmless or non-hazardous by-products. The metal ions (predominantly iron and copper ions) in the waste water 12 precipitate from the solution and settle in the tanks 14 as an insoluble hydroxide sludge 24. Separate settlement tanks (not shown) may be provided if desired. The dissolved iron in the reaction tanks 14 acts as a catalyst to oxidize the chelants and as a flocculent to promote precipitation of other metal species. The reaction tanks 14 are equipped with agitators 26 as well as temperature and pressure indicators, over-pressure protection and vent lines, not shown, but which are well understood by those skilled in the art.

Vapors and gasses, i.e. the harmless by-products produced by oxidation, are vented to atmosphere through demister 28 and high efficiency particulate air (HEPA) filter 30 via outlet 32. Hence, a portion of the waste solution volume is reduced by vaporization and gassification during the reaction step. When the filter 30 is saturated, the filter materials (not shown) are disposed of as hereinafter described.

After most of the chelating agents have been oxidized in the reaction chamber 14, the waste 24 is conducted to one or more centrifugal separators 34 over lines 36 which includes a series pump 38. The separators 34 separate concentrated precipitate from the clear liquid on the basis of differences in specific gravities. Several stages of centrifugal separators 34 may be required depending upon specific gravities and the degree of separation desired.

In accordance with the invention, clear liquid containing dissolved metal ions and the not fully oxidized chelants or chelant by-products known as aromatics is conducted through an activated charcoal filter 39 to one or more ion exchange columns 40 via liquid lines 42. The filter 39 removes the aromatics and when saturated the carbon is disposed of as hereinafter described. After ion exchange to remove soluble metal ions (e.g. cesium), clear liquid is conducted by the pump 46 to one or more holding tanks 44 via lines 48 for holding and testing prior to discharge point 50 as illustrated. At the completion of the ion exchange process, spent ion exchange resins in the chamber 40 are pumped to a canister station 52 via lines 54. The ion exchange resins are solidified in a concrete matrix for burial at the disposal site. Similarly, saturated materials from HEPA filter 30 and charcoal filter 39 are transferred to canister state 52 for packaging and disposal.

The concentrated precipitate from the centrifugal separators 34 is pumped to a dryer 56 via lines 58, where the water of hydration is removed from the metallic hydroxides. Methods for removal of excess water include scraped film evaportion, vacuum filtration, drum flaking, or other drying techniques. By removing the water of hydration, a significant portion of the volume of the solid waste is reduced. The dewatered precipitate is pumped to the canister station 52 via line 58 where it too is mixed with concrete or other similar material for solidification and burial at a waste disposal site. A dryer vent 60 may be coupled to the inlet of the demister 28 and filter 30 if desired or a self-contained environmentally suitable purification device may be provided to vent evaporated water of hydration to atmosphere.

The various control functions may be handled manually or automatically by a control station 60. A programmable numerical controller, a CPU or a manual control may be utilized as desired. Such controls are known in the art.

In accordance with the invention, by using hydrogen peroxide to oxidize the EDTA in the waste solution, hazardous chelating agents are converted into gas, vapors and water. The gas and vapors are treated in a demister and filter and discharged to atmosphere. The water is subsequently treated in the carbonaceous filter and the ion exchange column for subsequent disposal or reuse and the precipitate is separated out of the waste solution, dried and treated as solid waste for disposal at the burial site. The technique rapidly and safely reduces the volume of waste to the smallest theoretical possible volume for disposal.

Figure 2:
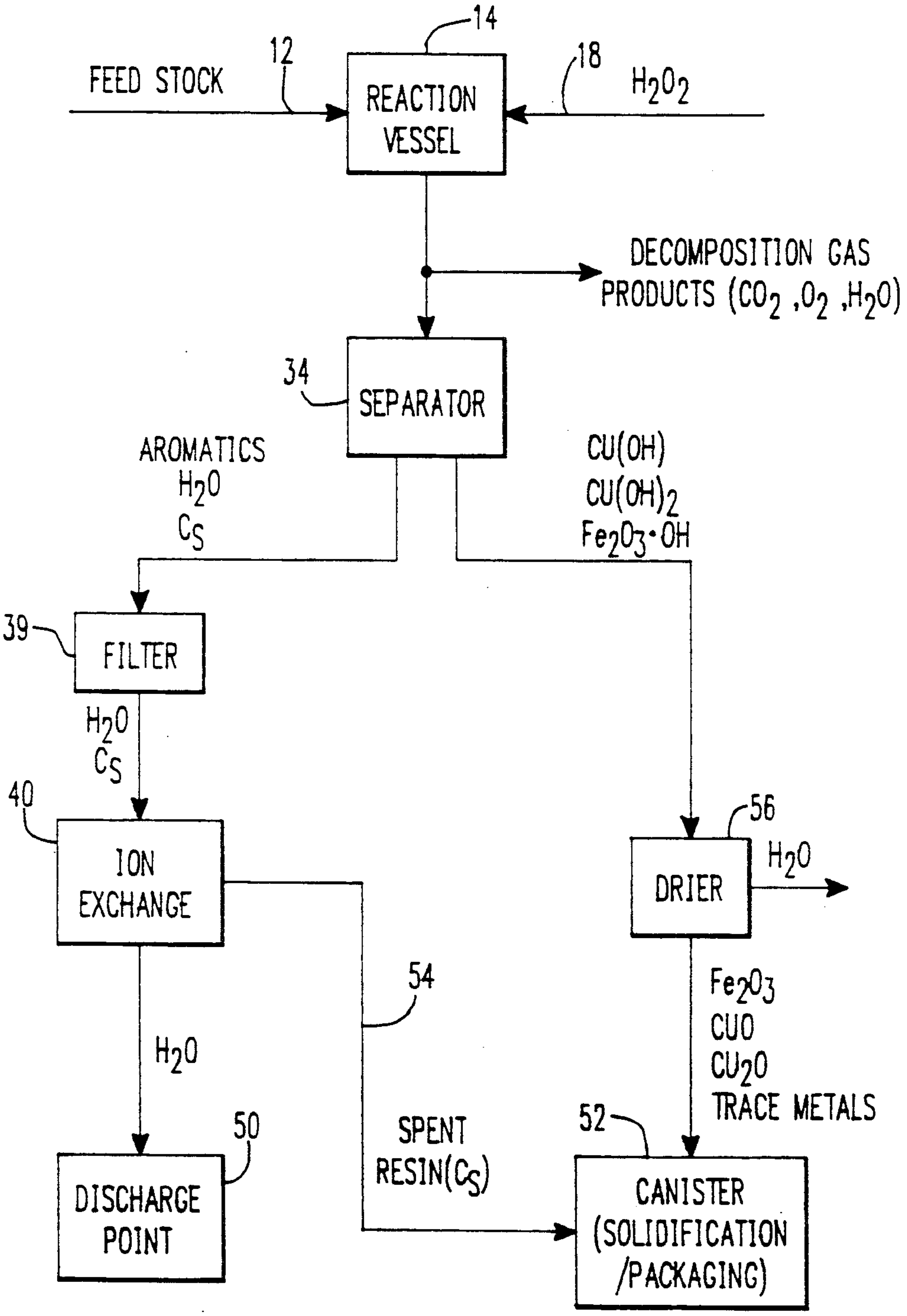
FIG. 2 is a schematic block diagram illustrating a batch process for handling contaminated radioactive waste in accordance with the present invention.

The batch process diagram of FIG. 2 shows the process flow of the invention. The blocks illustrate the various functional stages and the arrows indicate process flow of the materials carried from stage to stage throughout the process. In the arrangement illustrated in FIG. 2, the reaction vessel 14 receives the feedstock 12 containing EDTA, metal ions, organic material and other radionuclides. The reaction vessel 14 also receives hydrogen peroxide 18 as shown. Decomposition of the EDTA chelating agent and the feedstock 12 results in reaction products such as carbon dioxide, oxygen and water, and a hydroxide sludge. Solid materials in the sludge are removed by the action of the separator 34 while the dissolved radionuclides are decanted with the liquid. The liquid containing aromatics and dissolved radionuclides is directed to an activated charcoal filter 39 for removal of the aromatics and thereafter is conducted to the ion exchange column 40 for removal of dissolved radionuclides. Solid materials are directed to the dryer 56. After ion exchange clear water is discharged to a hold up tank for testing prior to discharge to a pond, stream or water storage tank for reuse. Dried solids, spent resins and filter materials are directed to the canister section 52 for solidification or packaging. If desired, a disposable ion exchange reactor 40 may be used, in which case such vessels are sealed and buried at the disposal site.

EXAMPLE

Hydrogen peroxide is a strong oxidizing agent which has been shown to be effective in oxidizing chelants. During the development of the invention, NTA, citric acid and oxalic acid were oxidized by hydrogen peroxide at low pH levels (pH=2.3). These reactions indicate that the dissolved iron acts as a catalyst and a two to five fold stoichiometric excess of peroxide at slightly elevated temperatures (40°-60° C.) enhanced the reaction rate. Similar tests utilizing an EDTA containing decontamination solution of pH=2.3 obtained a 90-95% destruction of the EDTA at 90° C. Additional experiments on citric acid oxidation at 40-60° C. and pH 4.5 resulted in similar stoichiometric excess and ion requirements. EDTA is less stable and hence more reactive than either NTA or citric acid. Accordingly, the experimental conditions recited above appear to represent a conservative upperband.

Tests conducted on a synthetic chemical waste solution developed to simulate actual chemical waste resulted in indications that a two-fold stoichiometric excess of peroxide was sufficient to precipitate 99% of the iron. Oxidation of the EDTA and the formation and settling of the precipitate occurred rapidly.

An exemplary chemical cleaning waste solution used in the process development is set forth in Table I. In actual field, applications a wide range of metal ion and chelant concentrations are expected. The quantity of metal ions is limited by the capacity of the chelant to hold the ions in solution. The amount of peroxide added during processing is adjusted, based on chelant concentration, to obtain the desired stoichiometric relationship.

TABLE I

| CHEMICAL CLEANING WASTE SOLUTION | |
|---|---|
| EDTA | 11.9 ± 0.4% |
| pH | 7.6 |
| $Co^{60}$ | $2 \times 10^{-5}$ μCi/ml |
| $Cs^{137}$ | $1 \times 10^{6}$ μCi/ml |
| $Cs^{134}$ | $8 \times 10^{6}$ μCi/ml |
| Fe | 6725 ppm |
| Na | 102 ppm |
| Ni | 107 ppm |
| Pb | 47 ppm |
| Mn | 92 ppm |
| Zn | 28 ppm |
| Cu | 13 ppm |
| Ti | 10 ppm |
| Cr | 7 ppm |

In a preferred embodiment of the invention, the waste solution is treated in a batch process similar to that illustrated in FIG. 2. The waste solution is batched to the processing tank 14 where a 50% hydrogen peroxide solution 18 is slowly added. The peroxide oxidation reaction is exothermic and thus adds heat to the reaction process. Accordingly, additional heat may not be necessary. The temperature of the reaction, however, may be monitored and the addition rate of hydrogen peroxide may be monitored to obtain a temperature between about 40° and 60° C. The peroxide addition is continued until the desired stoichiometric excess (two-fold) has been added in order to result in a precipitation of 99% of the ion. The use of an additional flocculent to assist in the settling of the iron hydroxide precipitate should not be required but may be provided if desired.

Following settling the clear liquid is filtered and ion exchanged as noted and the precipitate which consists of insoluable metal hydroxides (primarily iron and copper) is prepared for burial at a burial site after drying and canistering.

The oxidation by hydrogen peroxide requires the minimum equipment for processing and results ultimately in the generation of minimum volume of solid wastes for burial.

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practice within the art to which the invention pertains.

What is claimed is:

1. Apparatus for concentrating dissolved and solid radioactive materials carried in a waste water solution containing a hazardous chelating agent used for cleaning nuclear equipment comprising:

oxidizing chamber means for receiving the waste water containing the radioactive materials and hazardous chelating agent in the presence of an oxidizing agent for oxidizing the chelating agent into a stream of non-hazardous material including gasses and water, and for causing additional solids to precipitate out of the solution;

separator means coupled to said oxidizing chamber means for receiving from the oxidizing chamber the waste water containing the radioactive material and for separating radioactive solids from the waste water containing dissolved radioactive materials;

ion exchange means containing an ion exchange resin for receiving the waste water containing the dissolved radioactive materials and for removing the same from the waste water by ion exchange with the resin;

dryer means for receiving the radioactive solids from the separator means and for producing dry solids; and packaging means for receiving the dry solids and spent ion exchange resins containing the removed dissolved radioactive materials and for packaging the dry solids and spent resins in solid form.

2. The apparatus of claim 1 wherein a non-oxidized residual portion of the chelating agent remains in said stream and further including carbonaceous filtering means for filtering the non-oxidized residual portion.

3. The apparatus of claim 1 further comprising filter and demister areas for removing particles and vapors from the non-hazardous gasses.

4. The apparatus of claim 1, wherein said oxidizing chamber means is operable to oxidize a chelating agent in the presence of a catalyst contained in the solution.

5. The apparatus of claim 1, wherein said oxidizing chamber means is operable to oxidize a chelating agent in the presence of an iron catalyst contained in the solution.

6. The apparatus of claim 1, wherein said oxidizing chamber means is operable to oxidize a chelating agent that is selected from the group consisting of EDTA, NTA, citric acid or other organic chelant.

7. The apparatus of claim 1, wherein said oxidizing chamber means is operable to oxidize a chelating agent in the presence of a hydrogen peroxide solution.

8. The apparatus of claim 1, wherein said oxidizing chamber means is operable to oxidize a chelating agent in the presence of a hydrogen peroxide solution having at least a 2:1 stoichiometric excess of the chelating agent.

9. The apparatus of claim 1, wherein said oxidizing chamber means is operable to oxidize at temperatures above 40° C.

10. The apparatus of claim 1, wherein said oxidizing chamber means is operable to oxidize at temperatures in the range of 40°-200° C.

11. The apparatus of claim 1, wherein said oxidizing chamber means is operable to precipitate out of the solution 99% of iron present therein.

* * * * *